United States Patent [19]

Billings

[11] Patent Number: 4,889,443

[45] Date of Patent: Dec. 26, 1989

[54] CONNECTION ARRANGEMENT

[75] Inventor: David L. Billings, Louisville, Ky.

[73] Assignee: General Electric Company, Louisville, Ky.

[21] Appl. No.: 278,968

[22] Filed: Dec. 2, 1988

[51] Int. Cl.[4] .................... B25G 3/24; B25G 3/20; F16B 2/02; F16D 1/08

[52] U.S. Cl. .................... 403/365; 403/290; 403/370; 403/371; 403/374; 74/548; 74/553; 16/118; 16/121; 16/DIG. 24; 16/DIG. 30; 16/DIG. 40

[58] Field of Search ............ 403/290, 365, 366, 368, 403/370, 371, 374, 303, 309, 313, 314, 357; 74/548, 551.1, 553; 16/118, 121, DIG. 24, DIG. 30, DIG. 40; 29/161, 373

[56] References Cited

U.S. PATENT DOCUMENTS

| 1,547,247 | 7/1925 | Werner | 16/DIG. 30 X |
|---|---|---|---|
| 2,149,746 | 3/1939 | Pfeiffer | 403/357 |
| 2,256,419 | 9/1941 | Tinnerman | 403/357 |
| 2,745,689 | 5/1956 | Balint et al. | 403/357 |
| 2,968,504 | 1/1961 | Hansen | 403/357 |
| 3,425,723 | 2/1969 | Parkin et al. | 287/53 |
| 3,558,165 | 1/1971 | Lundergan | 403/357 |
| 3,580,619 | 5/1971 | Maitais | 403/365 |
| 3,995,824 | 12/1976 | Bauer | 248/400 |
| 4,006,993 | 2/1977 | Woerlee | 403/359 |
| 4,227,826 | 10/1980 | Conrad | 403/371 |
| 4,286,897 | 9/1981 | Suskind | 405/221 |

FOREIGN PATENT DOCUMENTS 225621  3/1969  Switzerland ............ 403/289

Primary Examiner—Andrew V. Kundrat
Assistant Examiner—Franco Deliguori
Attorney, Agent, or Firm—Radford M. Reams; Frederick P. Weidner

[57] ABSTRACT

A generally cylindrical shaft has a longitudinally extending flat area along its end section. A plastic member mounted on the shaft has a longitudinal bore complimentary in shape to and fitting around the shaft end section. The bore includes a longitudinally extending recess projecting radially outward from the flat area of the shaft. A locking sleeve fits within the bore and around the shaft and includes a generally U-shaped portion received in the recess. The U-shaped portion is discontinuous intermediate its ends, providing first and second longitudinal portions adjacent its ends. A screw passes through the first longitudinal portion and threadedly engages the second longitudinal portion for drawing the portions together.

13 Claims, 1 Drawing Sheet

U.S. Patent Dec. 26, 1989 4,889,443
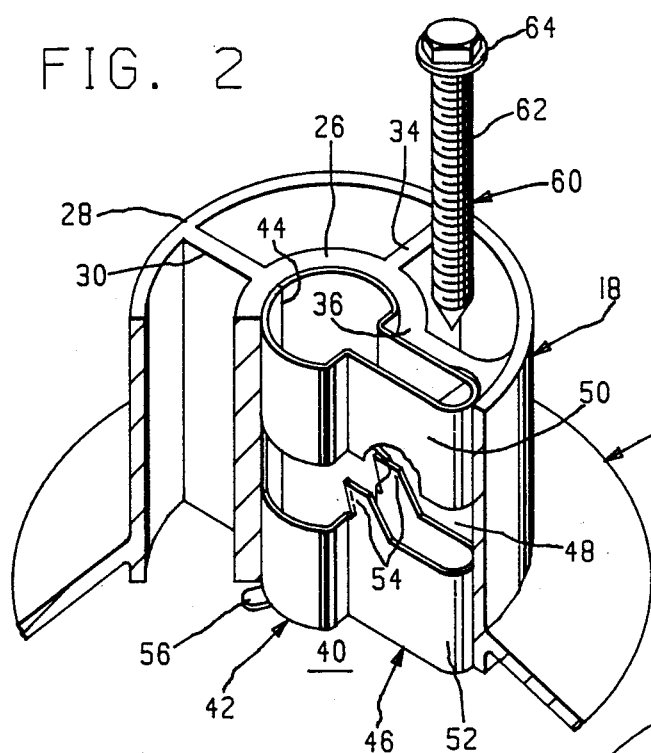
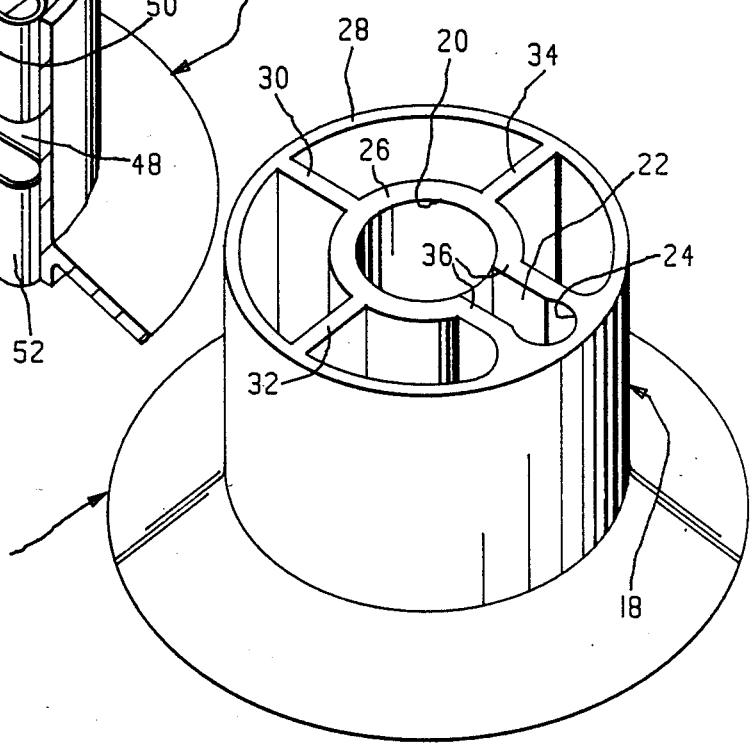
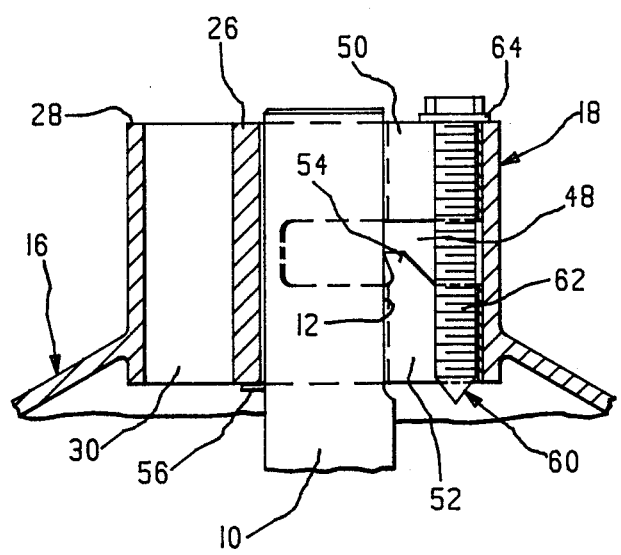
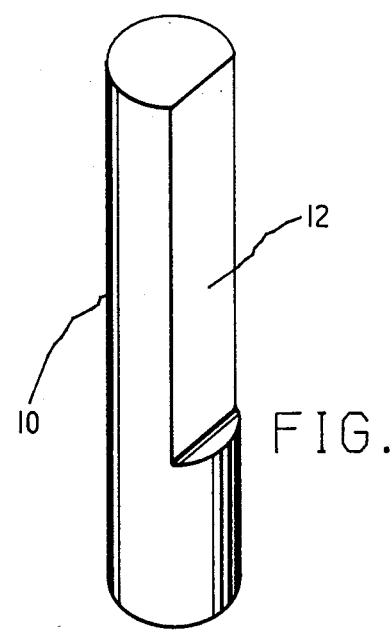

CONNECTION ARRANGEMENT

BACKGROUND OF THE INVENTION

There is a need for connection arrangements or mechanisms which securely connect plastic members or parts to other parts without exerting high pressures on the plastic parts. One area where such a need exists is connecting members, such as blower wheels for example, to rotatable drive shafts.

Many plastic materials are subject to a phenomenon called "cold flow." That is, when subjected to pressure, the material will very slowly flow or deform to relieve the pressure. As an example, when a typical clamp is used to secure a plastic blower wheel to a rotatable drive shaft, the material of the wheel flows or creeps over a period of time and the connection becomes loose.

An object of the present invention is to provide an improved arrangement for connecting a plastic member to an elongated shaft.

Another object of the present invention is to provide such a connection arrangement which is not subject to loosening with the passage of time.

Yet another object of the present invention is to provide such a connection arrangement which substantially overcomes problems associated with cold flow of the plastic material.

In accordance with one form of the present invention there is provided a connection arrangement including a rotatable shaft, having a generally cylindrical configuration, and a plastic member. The plastic member has an elongated, generally annular bore fitting around the shaft and a longitudinally extending recess projecting radially outward of the shaft. A locking sleeve fits within the bore and around the shaft. The sleeve has an outwardly extending bight portion received within the recess. At least the bight portion is split to include first and second longitudinally separated portions. Attaching means draws the first and second portions together for securing the locking sleeve and plastic member to the shaft.

BRIEF DESCRIPTION OF THE DRAWINGS

FIG. 1 is a cross-sectional view of one embodiment of the present invention.

FIG. 2 is a perspective view, partially broken away and partly exploded of the member, sleeve and screw incorporated the embodiment of FIG. 1.

FIG. 3 is a fragmentary perspective view of the member of the embodiment of FIG. 1.

FIG. 4 is a fragmentary perspective view of the elongated shaft of the embodiment of FIG. 1.

DESCRIPTION OF PREFERRED EMBODIMENTS

Referring to the drawings, there is shown a preferred embodiment of the present invention. As shown particularly in FIG. 4, a rotatable shaft 10 is of generally cylindrical configuration and has a longitudinally extending flat area 12 at its end so that the end section of the shaft 10 is generally D-shaped in cross-section.

FIG. 3 illustrates a member 16 having a hub 18 to be rotatably mounted on the shaft 10. Conveniently, the member 16 can take any number of forms, it can be a pulley or other member intended to rotate with the shaft 10, such as, for instance it can be the blower or fan blade structure for an air or liquid moving mechanism. The present invention is particularly useful in connecting such members and shafts when the member is formed of a plastic member that will cold flow or distort under pressure. However, it should be understood that the mounting arrangement of the present invention can be used when the member is formed of other materials, including metal, that do not cold flow. The hub 18 includes an elongated, generally annular bore 20 sized to fit around and conform to the configuration of the end portion of shaft 10. A longitudinally extending recess 22 projects radially outward of the bore 20 and thus the shaft 10 when the member 16 is mounted on the shaft. More particularly, as seen in FIG. 1, the recess 22 projects radially outward of flat area 12. The distal end of the recess 22 is formed with a longitudinally extending, generally cylindrical groove 24. In the preferred embodiment the groove 24 extends longitudinally of the hub 18 only about half the length of the hub. Conveniently, the bore 20 is formed by a longitudinally extending inner sleeve portion 26 of the hub 18, which also includes an outer sleeve portion 28. Strength and rigidity are provided to the hub by interconnecting the inner and outer sleeve portions with webs 30, 32, 34 and 36. The recess 22, and groove 24 are formed in the web 36.

As best seen in FIGS. 1 and 2, there is provided a locking sleeve 40, preferably formed from steel or other strong and resilient material. The locking sleeve 40 includes a main body 42 which is configured to fit closely around the end portion of the shaft 10 and within the bore 20 of the member 16. In the preferred embodiment the main body 42 is substantially D-shaped and cross-sectional configuration, as the illustrative shaft 10 has a D-shaped end section. The main body 42 has a longitudinally extending slit 44. Preferably the sleeve 40 is formed by bending a strip of metal and the slit 44 is the position where the ends of the strip of metal come together.

The locking sleeve 40 also includes a U-shaped bight portion 46 extending generally radially outwardly from the main body 42. The bight portion 46 has a radially extending discontinuity 48 dividing the bight 46 into first and second longitudinally separated portions 50 and 52. The discontinuity 48 conveniently also may extend partially around the main body 42. The second or lower longitudinally separated portion 52 includes a pair of barbs 54 whose function will be more completely described hereafter. The lower end of the sleeve 40 contains one or more tangs such as that illustrated at 56.

The sleeve 40 is mounted in the bore 20 and recess 22 from the lower end, as seen in FIGS. 1 and 2. The tangs 56 engage the lower end of the inner sleeve portion 26 of hub 18 and prevent the locking sleeve 42 from sliding upwardly out of the hub 18. A screw 60 having a threaded shaft 62 and an integral washer 64 is inserted into the distal end of the U-shaped bight portion 46. The integral washer 64 is sized so as to overlap the web 36. The threaded shaft 62 is slightly larger than the opening in the bight portion so that it tends to bite into the metal forming the sleeve 40. However, since the groove 24 surrounds the distal end of the first or upper longitudinally separated portion 50 of the bight 46, the upper portion is free to deform into the groove and thus the shaft 62 does not threadedly engage the first portion 50. As previously explained the groove 24 extends only about half the longitudinal length of the hub 18 and thus does not overlap the second or lower longitudinally separated portion 52 of the bight 46. Thus the threads on the shaft 62 cut into the material of the lower portion 52. As the screw is tightened the first and second longitudinally separated portions are drawn toward each other. This causes the sleeve 40 to deform slightly so that the main body 42 tightly grips the shaft 12 and the barbs 54 engage and preferably bite into, the flat area 12. The washer 64 prevents the sleeve 40 from moving downwardly, as seen in FIGS. 1 and 2, out of the hub 18. The tight engagement of the main body 42 and barbs 54 of the locking sleeve 40 with the shaft 10 lock the member 16 and sleeve 40 to the shaft 10 for rotation with the shaft.

While the screw 60 has been shown with an integral washer 64 it will be understood that a separate washer of appropriate size could be utilized. It also will be understood that a bolt with an appropriately sized washer or head at the top could be utilized with a separate nut to drive the longitudinal portions 50 and 52 together. In such a construction the nut, washer or head provided adjacent the second or lower portion 52 of the sleeve 40 must not overlap the web 36 so that the nut and bolt will be effective in drawing the longitudinal portions 50 and 52 together while the washer adjacent the upper portion 50 overlaps web 36 to prevent longitudinal separation of the member 16 and sleeve 40 in one axial direction. Also the relative longitudinal position of the tangs 56 and washer 64 can be reversed.

It shall be apparent to those skilled in the art that, while I have described what I presently consider to be preferred embodiments of my invention in accordance with the patent statutes, changes may be made in the disclosed embodiments without departing from the true spirit and scope of the invention.

What I claim as new and desire to secure by Letters Patent of the United States is:

1. A connection arrangement comprising:
   a rotatable shaft of generally cylindrical configuration;
   a plastic member having an elongated, generally annular bore fitting around said shaft; said bore including a longitudinally extending recess overlapping and projecting generally radially outward of said shaft;
   a locking sleeve formed from a strip of metal and fitting within said bore around said shaft; said sleeve having an outwardly projecting bight portion received within said recess; at least said bight portion being split so as to include first and second longitudinally separated portions;
   attaching means effective to draw said first and second longitudinally separated portions toward one another for securing said locking sleeve and member to said shaft.

2. A connection arrangement as set forth in claim 1, wherein said sleeve includes barb means engaging said shaft upon said first and second longitudinally separated portions being drawn toward one another.

3. A connection arrangement as set forth in claim 1 wherein one of said sleeve and said attaching means includes means preventing relative longitudinal movement of said member and said locking sleeve in one direction and the other of said sleeve and said attaching means includes means preventing relative longitudinal movement of said member and said locking sleeve in the other direction.

4. A connection arrangement as set forth in claim 1, wherein said attaching means includes screw means passing through said first longitudinally separated portion and threadedly engaging said second longitudinally separated portion for drawing together said first and second longitudinally separated portions toward one another.

5. A connection arrangement comprising:
   a rotatable shaft of generally cylindrical configuration having an end section with a longitudinally extending flat area;
   a plastic member having a longitudinal bore complementary in shape to and fitting around said shaft end section; said bore including a longitudinally extending recess projecting radially outward from said shaft flat area;
   a locking sleeve fitting within said bore and around said shaft; said locking sleeve including a generally U-shaped portion received in said recess; said U-shaped portion being discontinuous intermediate its ends to provide first and second longitudinally separated portions;
   attaching means effective to draw said first and second longitudinally separated portions toward one another for securing said sleeve and member to said shaft.

6. A connection arrangement as set forth in claim 5, wherein at least one of said first and second longitudinally separated sleeve portions includes barb means engaging said shaft flat area upon said first and second longitudinally separated portions being drawn toward another.

7. A connection arrangement as set forth in claim 5, further including means preventing relative longitudinal movement of said member and said locking sleeve.

8. A connection arrangement as set forth in claim 5, wherein said attaching means includes screw means passing through said first longitudinally separated portion and threadedly engaging said second longitudinally separated portion for drawing said first and second longitudinally separated portions toward one another.

9. A connection arrangement as set forth in claim 8, wherein said member includes longitudinally extending groove means adjacent said first longitudinally separated sleeve portion and permitting expansion of said first sleeve portion upon said screw means passing through said first sleeve portion.

10. A connection arrangement as set forth in claim 8 wherein said screw means includes washer means engaging said member for preventing relative movement of said member and said sleeve in one longitudinal direction.

11. A connection arrangement as set forth in claim 10, wherein said member and said sleeve have an interferring relationship for preventing relative movement of said member and said sleeve in the other longitudinal direction.

12. A connection arrangement as set forth in claim 11, wherein one end of said sleeve overlaps said member.

13. A connection arrangement as set forth in claim 5 wherein said sleeve includes a longitudinally extending split opposite said U-shaped portion.

* * * * *